Figure 1:
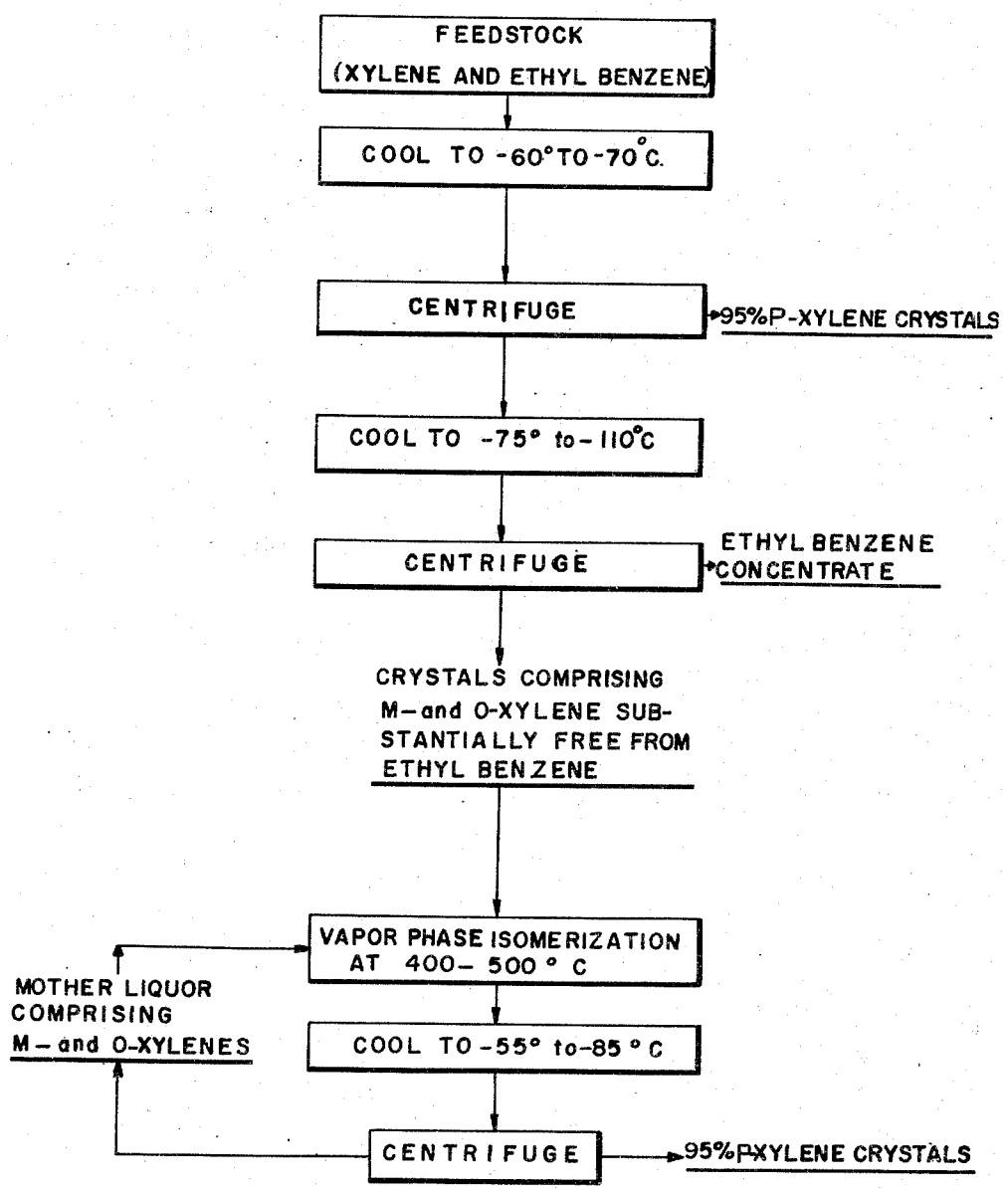

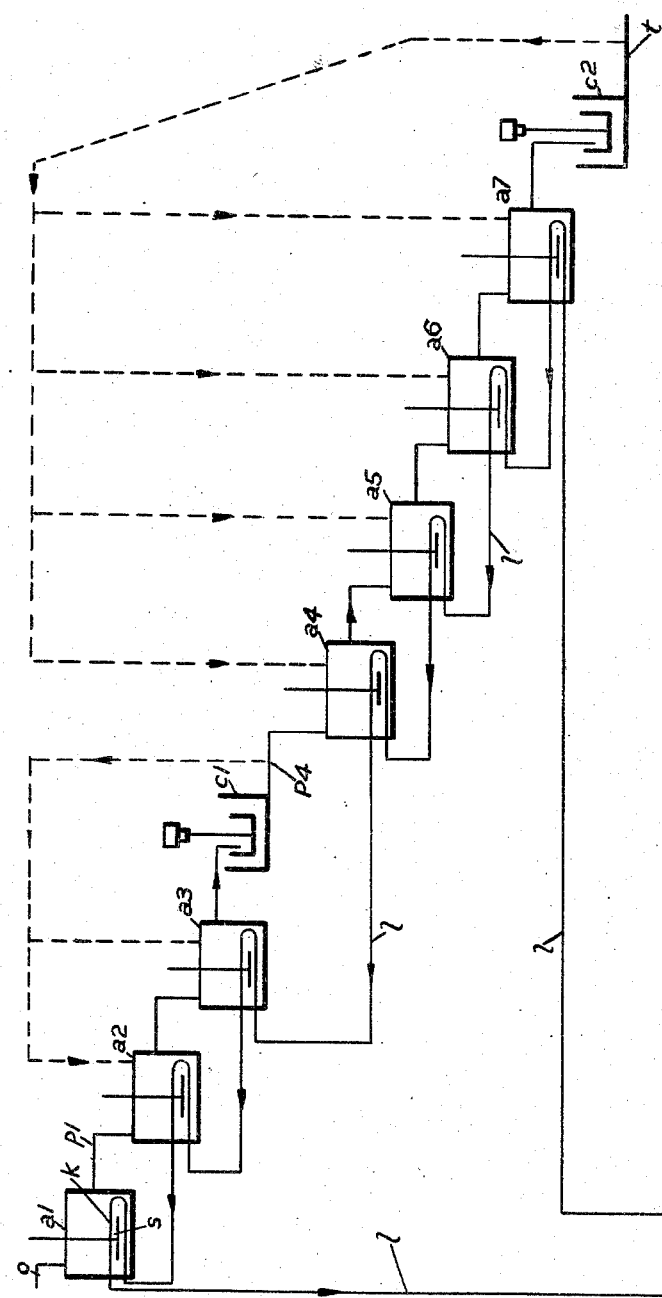

United States Patent Office 2,824,147
Patented Feb. 18, 1958

2,824,147

SEPARATION OF XYLENES

Robert Reid Coats and Gilbert Arthur Williams, Norton-on-Tees, England, assignors to Imperial Chemical Industries Limited, London, England, a corporation of Great Britain Application March 8, 1955, Serial No. 492,857

Claims priority, application Great Britain March 21, 1949

2 Claims. (Cl. 260—674)

This invention relates to the production of para-xylene from mixtures containing it.

Mixtures of the three xylenes with other compounds are frequently obtained in industrial processes, such as the treatment of coal tar or petroleum fractions. Typical mixtures of these types may contain, for example, a major proportion of meta-xylene; ortho-xylene and para-xylenes; and ethyl benzene, together with small amounts of other hydrocarbons. Since the boiling points of the three xylenes are close to one another, and the mixtures to be treated are most frequently narrow boiling fractions, separation of para-xylene in substantially pure form, by the methods available in the prior art has been difficult. It is an object of the present invention to provide an improved method of producing para-xylene in substantially pure condition and in enhanced yield from such mixtures and simultaneously valuable and useful ethyl benzene concentrate.

According to the present invention there is provided a continuous process for the production of para-xylene substantially free from ethyl benzene, and simultaneously an ethyl benzene concentrate, from xylene feedstock containing para-xylene and ethyl benzene, which comprises subjecting the feedstock to a temperature within the range of from —60° C. to —75° C., whereby crystals of para-xylene are precipitated, separating these crystals by centrifuging whereby there is obtained para-xylene of not less than 95% purity, subjecting the resulting mother liquor to a temperature below —75° C. and not below —110° C., whereby mixed xylene crystals rich in meta- and ortho-xylenes are precipitated, centrifuging the mixture whereby there are obtained an ethyl benzene concentrate containing a predominant proportion of ethyl benzene and a minor proportion of xylenes and a crystalline fraction rich in meta- and ortho-xylenes and substantially free from ethyl benzene vaporizing this last fraction and subjecting it in admixture with an isomerizate obtained as hereinafter defined to isomerization in the vapor phase in the presence of an isomerization catalyst at 400° C. to 500° C., freezing out para-xylene from the product by cooling to between —55° C. and —85° C., separating the para-xylene by centrifuging to yield further para-xylene of at least 95% purity and obtaining a mother liquor, which is the isomerizate for recycling.

When only small amounts of the other hydrocarbons are present, the mother liquor remaining at below —100° C. approximates in composition to the quaternary eutectic, viz.:

| | Percent by weight |
|---|---|
| Ethyl benzene | 78.8 |
| Ortho-xylene | 5.4 |
| Meta-xylene | 14.9 |
| Para-xylene | 0.9 |

The quaternary eutectic mixture has a freezing point of about —101° C., and theoretically freezing could be carried down to the freezing point of the quaternary mixture. However, since it is possible that the above figure for the freezing point may be inexact, and since the presence in the mixture being treated of other compounds can affect the freezing point of the quaternary mixture, it may in practice be desirable to freeze to a lower temperature than aforesaid before separating, viz. down to —110° C.

The freezing process may be conducted in two ways as follows: the cooling may be conducted under such conditions that xylene is deposited on cooled surfaces from which it can subsequently be removed, for example, by mechanical means such as scrapers, or by warming; or secondly, it may be precipitated by cooling the liquid mixture and recovering xylene from the resulting sludge by centrifuging. The first method may be conducted, for example, by passing the mixture to be treated through a jacketed, cooled vessel, or through a vessel containing cooling coils, and scraping off the deposited xylene from the cooled surfaces and centrifuging it.

It is preferred to agitate the liquid during cooling, preferably by stirring. The centrifugals and auxiliary equipment should be cooled to about the same temperature as the freezing vessel or vessels with which they are associated.

It is preferred to wash the product on the centrifuge with a washing liquid such as pentane.

The process may be conducted in one or more stages and each stage may be conducted in a single vessel or by the use of a number of vessels. When a number of vessels is employed these may be in cascade. Preferably the number of stages, and the temperature and the conditions in each, are controlled to yield a slurry in which the solid content by weight is from 5 to 50%, preferably 15 to 25%, which is well adapted for centrifuging. The consistency of the slurry can be controlled in any stage by recycling a suitable proportion of the mother liquor thereto. In the multi-stage process the recycled liquor may be introduced at any or all of the stages of cooling as may be desired.

If desired a diluent may be added, but this is seldom done.

As an example of one method of conducting the freezing operation a mixture having the following composition:

| | Percent by liquid volume |
|---|---|
| Ethyl benzene | 11 |
| Para-xylene | 23 |
| Ortho-xylene | 11 |
| Meta-xylene | 52 |
| Other hydrocarbons | 3 | is treated in two main stages, firstly by cooling within the range of —60° C. to —75° C. in two steps with separation of para-xylene by centrifuging after the second step, and secondly cooling within the range of —75° C. to —100° C. in a series of four steps and separating a fraction rich in ortho- and meta-xylenes and containing some para-xylene by centrifuging after the last step. This fraction is passed to isomerization. Sufficient mother liquor is recycled to the second stage at any step thereof desired, in order to maintain the slurry at the correct consistency.

This process is schematically illustrated in Figure 1 of the accompanying flow diagrams.

The process may conveniently be carried out in the cascade type of equipment shown diagrammatically in the accompanying Figure 3 of the drawings, in which $a_1, a_2 \ldots a_7$ are insulated vessels each provided with a cooling coil $k$ and mechanical stirrer $s$; and C1 and C2 are insulated centrifuges. The cooling coils are connected in series by a closed pipe line $l$ in which a coolant, such as pentane, is circulating countercurrent, and which is connected at $rr$ to a refrigerating machine of conventional type.

The mixed xylenes feed at normal temperature is fed continuously through pipe $o$ to the first vessel $a_1$ in which pre-cooling to $-64°$ C. takes place and little or no precipitation of solid occurs. The cooled liquid in $a_1$ overflows through the pipe $p_1$ into the vessel $a_2$, in which the mixture is cooled further to $-70°$ C., and the overflow from $a_2$ is continuously introduced into $a_3$ where the mixture is further cooled to $-76°$ C. The overflow from $a_3$ is intoduced into the centrifuge $c_1$ and there continuously separated into a solid para-xylene fraction, which if desired may be washed on the centrifuge with a cold solvent such as pentane, and a liquid fraction, which is fed through the line $p_4$ to the next cooling vessel $a_4$ in which cooling to $-82°$ C. takes place. If desired part of the separated liquid from $C_1$ may be diverted and returned though pipe lines (shown dotted) to vessels $a_2$ or $a_3$, to maintain the slurry there at the desired consistency.

The remaining vessels $a_5$, $a_6$, $a_7$ are maintained at $-88°$, $-94°$ and $-100°$ C. respectively. The slurry from $a_7$ is treated in centrifuge $C_2$ and the bulk of the xylenes is obtained therefrom as solid, which if desired can be washed on the centrifuge with pentane or other cold solvent. This solid forms the feedstock for the isomerization process.

The residual quaternary eutectic is removed to storage through line $t$, and part of it returned as required to any or all of $a_4$, $a_5$, $a_6$, $a_7$ as shown by the dotted lines, in order to maintain the slurry at each of these points at a suitable operating consistency. The slurry must not be allowed to become too thick.

Figure 2:
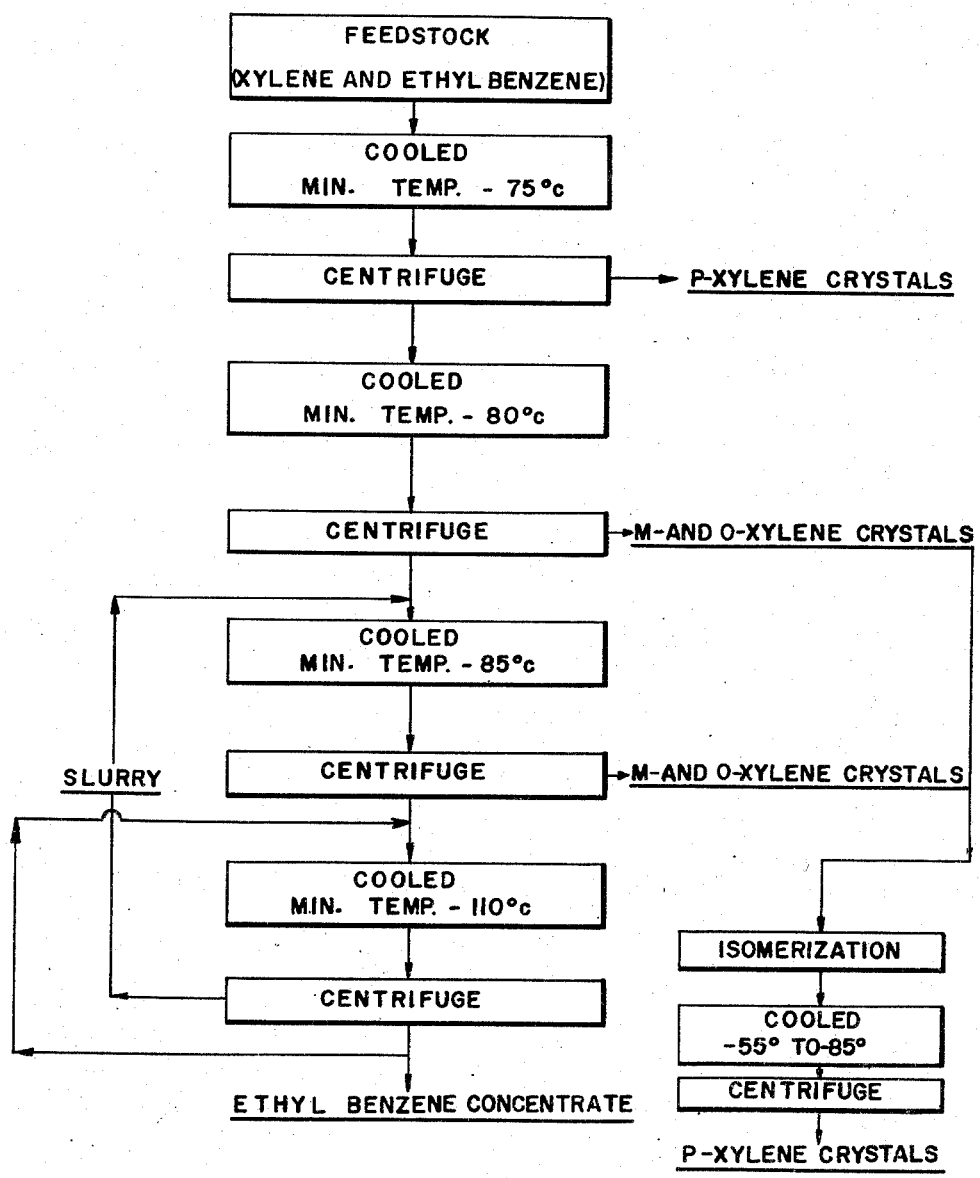

In the preferred form of the process of the invention schematically illustrated in Figure 2 of the accompanying flow diagrams the xylene feedstock is fed to a first freezer in which it is cooled to a temperature not below $-75°$ C., the cooled mixture is centrifuged whereby there are obtained a mother liquor and crystals of para-xylene product containing not less than 95% para-xylene which are separated; the mother liquor is fed to a second stage freezer in which it is cooled to a temperature not below $-80°$ C., the cooled mixture is centrifuged whereby a mother liquor and a crystalline xylene fraction rich in meta- and ortho-xylenes are separated; the mother liquor from the second stage together with slurry obtained from the fourth stage is fed to a third stage freezer and is there cooled to a temperature not below $-85°$ C., the cooled mixture is centrifuged, whereby a mother liquor and a further crystalline xylene fraction rich in meta- and ortho-xylenes are separated; the mother liquor from the third stage, together with recycled ethyl benzene concentrate from the fourth stage is fed to a fourth stage cooler in which the mixture is cooled to a temperature not below $-110°$ C. and the cooled mixture is centrifuged whereby there are obtained a slurry which is recycled to the third stage and an ethyl benzene concentrate, part of which is recycled to the fourth stage and the remainder of which is taken to storage; the two streams rich in meta- and ortho-xylenes are combined and passed to an isomerization stage as already described and the para-xylene produced is frozen out from the product at a temperature within the range of $-55°$ C. to $-85°$ C. and separated by centrifuging.

Yields of para-xylene of over 70% by weight based on the xylene content of the feedstock are readily obtained by the process.

The process has enhanced efficiency because deep freezing of this sort is best conducted in stages and advantage is taken of the first stage cooling to recover a large proportion of the para-xylene content of the feedstock.

The ethyl benzene concentrate contains over 70% by weight of ethyl benzene and can be concentrated further by extractive distillation by using phenols, especially cresols, as the solvent, and if necessary adding some aliphatic hydrocarbons.

Suitable conditions for the isomerization which is conducted in the vapor phase, are a temperature of 400° C. to 500° C. and a liquid space velocity of 0.5 to 10 litres per litre of bulk catalyst volume per hour, preferably from 2 to 5 litres per litre per hour.

Preferably the process is operated as a moving burden process in which the catalyst granules move under gravity and in which the vapors move countercurrently to the catalyst granules. The preferred catalyst is alumina/silica gel.

Other isomerization catalysts such as oxides, alumina, zirconia, titania, thoria and beryllia, or mixtures of these containing silica, which have been contacted with fluorine or a fluorine-containing compound such as hydrofluoric acid, silicon tetrafluoride, chlorine trifluoride, phosphorus pentafluoride, phosphorus trifluoride and phosphorus oxyfluoride; boron trifluoride or a complex thereof. All of these catalysts are substantially free from alkalis e. g. contain less than 0.1% by weight and preferably less than 0.01% by weight of alkali.

*Example*

In a first stage 100 parts by weight of a mixed xylene fraction having the composition by weight:

| | Percent |
|---|---|
| Para-xylene | 19.2 |
| Meta-xylene | 45.5 |
| Ortho-xylene | 18.3 |
| Ethyl benzene | 15.0 |
| Paraffin and naphthenes | 2.0 | was cooled down to $-75°$ C. in a first cooler cooled by indirect heat exchange with cold pentane, and on centrifuging the cooled mixture there were obtained 12.9 parts by weight of crystals of 95% pure para-xylene and 87.1 parts by weight of mother liquor having the composition:

| | Percent |
|---|---|
| Para-xylene | 8.0 |
| Ortho- and meta-xylenes | 72.7 |
| Ethyl benzene | 17.0 |
| Paraffins and naphthenes | 2.3 |

This mother liquor was then cooled to $-80°$ C. in a second stage freezer cooled by indirect heat exchange with cold pentane and on centrifuging the cooled mixture there were obtained 21 parts by weight of crystals comprising mixed xylenes rich in ortho- and meta-xylenes and 66 parts by weight of a mother liquor.

This mother liquor was mixed with 145.5 parts of slurry returned from a subsequent stage four and cooled in a third stage freezer in indirect heat exchange with cold pentane to $-85°$ C. On centrifuging the cooled mixture there were obtained 46.4 parts by weight of crystals comprising mixed xylenes rich in ortho- and meta-xylenes and a mother liquor enriched in ethyl benzene.

The 21 parts by weight of mixed xylenes from the second stage cooler and the 46.4 parts by weight of mixed xylenes from the third stage cooler were mixed to give 64.7 grams of a mixture which had the composition by weight:

| | Percent |
|---|---|
| Para-xylene | 10.1 |
| Meta-xylene | 63.0 |
| Ortho-xylene | 25.5 |
| Ethyl benzene | 1.2 |
| Paraffins and naphthenes | 0.2 | and this was fed to an isomerization system as hereinafter described.

The mother liquor from the third stage was mixed with 329 parts of ethyl benzene concentrate from the fourth stage, and was cooled to $-110°$ C. in a fourth stage freezer cooled by indirect heat exchange with cold pentane, and on centrifuging the cooled mixture there was obtained 145.5 parts by weight of mixed xylene slurry rich in meta- and ortho-xylene, which were recycled to the third stage freezer, 329 parts by weight of ethyl benzene concentrate which were recycled again to the fourth stage cooler, and 19.7 parts by weight of an ethyl benzene concentrate having the composition by weight:

| | Percent |
|---|---|
| Para-xylene | 0.5 |
| Meta-xylene | 13.5 |
| Ortho-xylene | 4.9 |
| Ethyl benzene | 71.3 |
| Paraffins and naphthenes | 9.5 | which were taken to storage.

The isomerization of the 67.4 parts by weight of xylenes rich in meta- and ortho-xylenes was conducted by mixing them with 1062.8 parts by weight of an isomerizate having the composition by weight:

| | Percent |
|---|---|
| Para-xylene | 8.0 |
| Meta- and ortho-xylenes | 42.0 |
| Paraffins and naphthenes | 50.0 | and obtained as hereinafter described and feeding the mixture at a liquid space velocity of 3 vols./volume of fresh catalyst/per hour through a cylindrical reactor in countercurrent to a stream of alumina/silica granules. The temperature in the reaction zone was 400° C. to 500° C. and the catalyst was regenerated continuously at 575° C.

The product was frozen to −85° C. to yield on centrifuging 51.3 parts by weight of 95% pure para-xylene crystals together with 1078.9 parts by weight of mother liquor having the composition by weight:

| | Percent |
|---|---|
| Para-xylene | 8.1 |
| Meta- and ortho-xylene | 44.8 |
| Paraffins and naphthenes | 47.1 | which was again fed to the isomerization reactor and yielded 1062.8 parts of isomerizate for recycling to isomerization.

There are thus obtained from 100 parts by weight of the mixed xylene feedstock containing 83% by weight of xylenes, 64.2 parts by weight of product comprising 95% pure para-xylene. Hence the overall yield based on xylenes is 78% of commercial para-xylene, or 74% pure para-xylene.

This application is a continuation-in-part of our application Serial No. 147,428, filed March 3, 1950, now abandoned.

What is claimed is:

1. A continuous process for the production of para-xylene substantially free from ethyl benzene, and simultaneously an ethyl benzene concentrate, from xylene feedstock containing para-xylene and ethyl benzene, and wherein the separation of said materials is effected solely by a crystallization technique, which comprises subjecting the feedstock to a temperature within the range of from −60° C. to −75° C. whereby crystals of para-xylene are precipitated, separating these crystals by centrifuging whereby there is obtained para-xylene of not less than 95% purity, subjecting the resulting mother liquor to a temperature below −75° C. and not below −110° C., whereby mixed xylene crystals rich in meta- and ortho-xylenes are precipitated, centrifuging the mixture whereby there are obtained an ethyl benzene concentrate containing a predominant proportion of ethyl benzene and a minor proportion of xylenes and a crystalline fraction rich in meta- and ortho-xylenes and substantially free from ethyl benzene, vaporizing this last fraction and subjecting it in admixture with an isomerizate obtained as hereinafter defined to isomerization in the vapor phase in the presence of an isomerization catalyst at 400° C. to 500° C., freezing out para-xylene from the product by cooling to between −55° C. and −85° C., separating the para-xylene by centrifuging to yield further para-xylene of at least 95% purity and obtaining a mother liquor, which is the isomerizate for recycling.

2. A process for the production of para-xylene substantially free from ethyl benzene and simultaneously an ethyl benzene concentrate from xylene feedstock containing para-xylene and ethyl benzene, and wherein the separation of said materials is effected solely by a crystallization technique, said process comprising feeding said xylene feed stock to a first freezer in which it is cooled to a temperature not below −75° C., the cooled mixture is centrifuged whereby there are obtained a mother liquor and crystals of para-xylene product containing not less than 95% para-xylene which are separated; the mother liquor is fed to a second stage freezer in which it is cooled to a temperature not below −80°, the cooled mixture is centrifuged whereby a mother liquor and a crystalline xylene fraction rich in meta- and ortho-xylenes are separated; the mother liquor from the second stage together with slurry obtained from the fourth stage is fed to a third stage freezer and is there cooled to a temperature not below −85° C., the cooled mixture is centrifuged, whereby a mother liquor and a further crystalline xylene fraction rich in meta- and ortho-xylenes are separated; the mother liquor from the third stage, together with recycled ethyl benzene concentrate from the fourth stage is fed to a fourth stage cooler in which the mixture is cooled to a temperature not below −110° C. and the cooled mixture is centrifuged whereby there are obtained a slurry which is recycled to the third stage and an ethyl benzene concentrate, part of which is recycled to the fourth stage and the remainder of which is taken to storage; the two streams rich in meta- and ortho-xylenes are combined and passed to an isomerization stage and the para-xylene produced is frozen out from the product at a temperature within the range of −55° C. to −85° C. and separated by centrifuging.

References Cited in the file of this patent

UNITED STATES PATENTS

| 1,940,611 | Strosacker et al. | Dec. 19, 1933 |
| 2,532,276 | Birch et al. | Dec. 5, 1950 |
| 2,540,977 | Arnold | Feb. 6, 1951 |
| 2,541,682 | Arnold | Feb. 13, 1951 |
| 2,622,115 | Carney | Dec. 16, 1952 |

FOREIGN PATENTS

| 833,153 | France | July 11, 1938 |